US006829240B1

(12) United States Patent
Lincoln et al.

(10) Patent No.: US 6,829,240 B1
(45) Date of Patent: Dec. 7, 2004

(54) SYSTEM FOR, AND METHOD OF, ATM SEGMENTATION AND RE-ASSEMBLY OF CELLS PROVIDING STREAMING DATA

(75) Inventors: Bradford C. Lincoln, Boulder; David R. Meyer, Lakewood, both of CO (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 0 days.

(21) Appl. No.: 08/757,288

(22) Filed: Nov. 27, 1996

(51) Int. Cl.[7] ............................. H04L 12/28; H04J 3/24
(52) U.S. Cl. ................................. 370/395.1; 370/474
(58) Field of Search ........................ 370/232, 392, 370/401, 466, 389, 394, 395, 397, 399, 409, 471, 474, 475, 705, 395.1, 395.31, 395.32, 395.6–395.65, 395.7–395.72, 419, 412, 454; 395/200.19, 200.64, 284, 250, 309, 849

(56) References Cited

U.S. PATENT DOCUMENTS

| | | | | |
|---|---|---|---|---|
| 4,947,388 A | * | 8/1990 | Kuwahara et al. | 370/392 |
| 5,396,492 A | * | 3/1995 | Lien | 370/412 |
| 5,495,478 A | * | 2/1996 | Wilkinson et al. | 370/412 |
| 5,568,478 A | * | 10/1996 | Van Loo, Jr. et al. | 370/395 |
| 5,600,633 A | * | 2/1997 | Jaisingh et al. | 370/395 |
| 5,602,853 A | * | 2/1997 | Ben-Michael et al. | 370/395 |
| 5,610,921 A | * | 3/1997 | Christensen et al. | 370/395 |
| 5,623,494 A | * | 4/1997 | Rostoker et al. | 370/397 |
| 5,625,625 A | * | 4/1997 | Oskouy et al. | 370/395 |
| 5,633,870 A | * | 5/1997 | Gaytan et al. | 370/395 |
| 5,649,110 A | * | 7/1997 | Ben-Nun et al. | 395/200.19 |
| 5,664,116 A | * | 9/1997 | Gaytan et al. | 395/200.64 |
| 5,689,509 A | * | 11/1997 | Gaytan et al. | 370/396 |
| 5,708,659 A | * | 1/1998 | Rostoker et al. | 370/392 |
| 5,796,735 A | * | 8/1998 | Miller et al. | 370/395.1 |

FOREIGN PATENT DOCUMENTS

EP 0703718 A2 3/1996

OTHER PUBLICATIONS

Dittia, Zubin, "Design of the APIC: A High Performance ATM Host–Network Interface Chip" Department of Computer Science, Washington University in St. Louis, IEEE 1995, pp. 179–187.

* cited by examiner

*Primary Examiner*—Andy Lee
(74) *Attorney, Agent, or Firm*—Keith Kind

(57) ABSTRACT

Data (e.g. legacy LAN traffic) segmented into packets provide a header and a cell payload for each cell in each packet. The cell payloads are transferred to a region address in a host memory in accordance with determinations by a control memory. When the cell payload is to be transmitted from the host memory, the cell payload for a particular region address is combined with the header stored in the control memory for such address. Streaming data (e.g. voice or video) occurs at a regular rate and is not necessarily broken into packets. The streaming data is segmented to provide cell headers and cell payloads. The cell payloads are then transferred to a host receive FIFO in accordance with a determination by the control memory and are stored in a data sink. Cell payloads from a data source are transferred into a host transmit FIFO at a particular rate and are transferred from the host transmit FIFO preferably at a substantially constant rate higher than the particular rate. These FIFO cell payloads are combined with the headers in the control memory. When the cell payloads in the host transmit FIFO become almost depleted, the transmission of the cell payloads from the host transmit FIFO is skipped to allow the host transmit FIFO to receive additional cell payloads from the data source. The transmit and receive FIFO's respectively maintain cell alignment by providing particular controls with respect to the minimum and maximum number of cell payloads in the FIFO's.

22 Claims, 7 Drawing Sheets

SYSTEM FOR, AND METHOD OF, ATM SEGMENTATION AND RE-ASSEMBLY OF CELLS PROVIDING STREAMING DATA

This invention relates to telecommunications systems for, and methods of, transferring telecommunications information through telephone lines. More particularly, this invention relates to systems for, and methods of, transferring streaming data such as digitally encoded video and voice signals efficiently and reliably through telephone lines.

BACKGROUND OF THE INVENTION

Telephone systems in the United States provide central office for receiving signals from calling telephones within a particular radius such as one (1) to two (2) miles from such central office. The telephone signals from the calling telephone are then transmitted through long distances from such central office. The telephone signals then pass to the receiving telephone through a second central office within a radius of one (1) mile to two (2) miles from a receiving telephone. The telephone signals then pass from the second central office to the receiving telephone.

The telephone signals are transmitted long distance between central offices through optical fibers which have replaced other media previously provided for such purposes. The optical fibers have certain distinctive advantages over the lines previously provided. They allow a significantly increased number of signals from different telephones to be transmitted at the same time through the optical fibers. They pass the digitally-encoded signals with a higher accuracy than other media.

Various systems have been adopted to carry digitally-encoded signals for telephone, video, and data services. One of such systems now being adopted is designated as asynchronous transfer mode (ATM). This system is advantageous because it recognizes that generally signals travel in only one direction at any one time between a calling subscriber and a receiving subscriber. The system preserves bandwidth in the other direction so that a maximum number of different messages can be transmitted in such other direction.

In ATM systems, cells are provided to transmit information between access multiplexers or terminals through central offices. Each of the cells contains headers identifying the calling and receiving stations and also contains a payload providing the information being transmitted and received. The cells pass from the calling telephone through the access multiplex to a first central station. The cells then pass through the first central station and optical fibers to a second central station and then to the receiving access multiplex. During the transfer of the cells to the central stations, the headers may be changed. These changes in the address indicate the path that the cell is following between each pair of central stations to reach the receiving telephone.

In the prior art, to reassemble cells into signals at the access multiplex, the header and the payload in each cell have been transferred to a control memory that processes the header to determine what path it came from so that the signal can be reassembled based upon this path. This has created certain difficulties. For example, it has required the control memory to be relatively large, particularly since the memory receives the header and the payload. It has also caused the transfer to be slow, particularly since the header and the payload have to be processed and the payload is generally twelve times longer than the header.

U.S. Pat. No. 5,949,781 discloses a system for, and a method of, overcoming the disadvantages discussed in the previous paragraphs as occurring in an ATM system. The system and method disclosed and claimed in U.S. Pat. No. 5,949,781 minimize the time for processing the cells to update the headers as the cells are transferred through the telephone lines between the calling telephone and the receiving telephone.

In one embodiment of the invention disclosed and claimed in U.S. Pat. No. 5,949,781, a header and a payload in a cell are separated for transfer between a cell interface and a host memory. The header is transferred to a control memory. The header is transferred to a control memory. For transfer to the host memory, the control memory initially provides a host-memory region address and the region length. The payload is recorded in such region address. The control memory also provides a second host-memory region address, and length, when the payload length exceeds the payload length in the first region address. For transfer from the host memory to the cell interface, the control memory provides a host memory region address. The cell interface passes a payload from such region address.

The system disclosed and claimed in U.S. Pat. No. 5,949,781 processes data which is segmented into packets and in which the packet data is further segmented into cells. As discussed above, the cells are then transferred into region addresses in a host memory buffer. The system disclosed and claimed in U.S. Pat. No. 5,949,781 relates primarily to packet data such as is provided for legacy LAN traffic.

In addition to packet data, ATM systems deal with streaming data such as voice and video. This data occurs at a regular rate and is not necessarily segmented into relatively large data units such as packets. Furthermore, the final end point for streaming data may not be the host CPU. Instead, it may be a special audio or video subsystem.

Providing a segmentation and reassembly (SAR) system oriented toward the use of a host memory buffer for streaming data has several disadvantages including the following:

1. The streaming data must be copied into the host memory buffer.
2. Buffer management and communication of buffer information between the host and the SAR system requires computing resources from the host computer.
3. In order to keep the overhead of the host memory buffer to a minimum, the buffer must have a size of several ATM cells. This adds to the latency of the streaming data.
4. Additional memory must be provided for the host buffers.

BRIEF DESCRIPTION OF THE INVENTION

This invention provides a system in which the packet data is transmitted and received as discussed above. In addition, the invention provides a system for, and method of, transmitting and receiving the streaming data. In this invention, the streaming data is transmitted from, and is received, in FIFO's. This minimizes the complexity and cost of the system.

In one embodiment of the invention, data (e.g. legacy LAN traffic) segmented into packets provide a header and a cell payload for each cell in each packet. The cell payloads are transferred to a region address in a host memory in accordance with a determination by a control memory. When the cell payload is to be transmitted from the host memory, the cell payload for a particular region address is combined with the header stored in the control memory for such address.

Streaming data (e.g. voice or video) occurs at a regular rate and is not necessarily broken into packets. Furthermore, the end point for the data may not be the host CPU. In this invention, the streaming data is segmented to provide cell headers and cell payloads. The cell payloads are then transferred to a host receive FIFO in accordance with a determination by the control memory and are stored in a data sink. Cell payloads from a data source are transferred into a host transmit FIFO at a particular rate and are transferred from the host transmit FIFO preferably at a substantially constant rate higher than the particular rate. Such cell payloads are combined with the headers in the control memory.

When the cell payloads in the host transmit FIFO become almost depleted, the transmission of the cell payloads from such other FIFO is skipped to allow such other FIFO to receive additional cell payloads from the data source. The transmit and receive FIFO's respectively maintain cell alignment by providing particular controls with respect to the minimum and maximum number of cell payloads in the FIFO's.

DETAILED DESCRIPTION OF THE INVENTION

Figure 1:
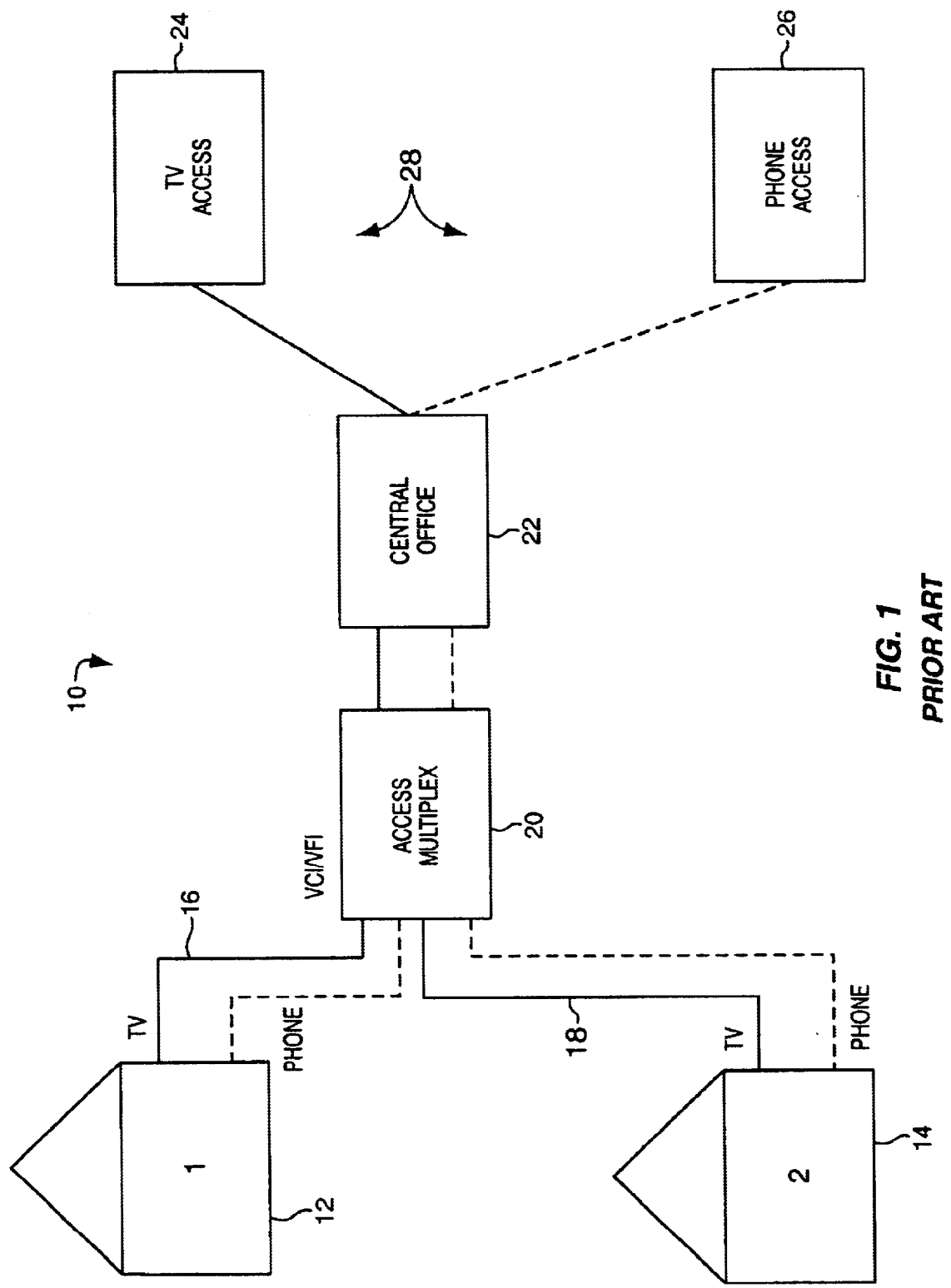
FIG. 1 is a schematic block diagram illustrating on a simplified basis the paths of transferring cells of information in an asynchronous transfer mode between a calling station and a receiving station through an access multiplexer.

FIG. 1 illustrates in block form a system generally indicated at 10 and known in the prior art for transferring signals to and from a pair of telephones (or sources) 12 and 14 respectively through lines 16 and 18 to a common access multiplex 20. The telephone (or source) 12 may illustratively transmit or receive television signals and telephone (voice) signals on a line 16 and the telephone (or source) 14 may illustratively transmit or receive television (video) signals and telephone (voice) signals on a line 18. All signals are digitally encoded. For purposes of simplification, the television (video) signals are shown in FIG. 1 as being transferred in solid lines and the telephone (voice) signals are shown in FIG. 1 as being transferred in broken lines.

The signals in the lines 16 and 18 pass to the access multiplex 20. The respective digitally-encoded transmit signals are segmented into fixed-length cell payloads and a cell header is added to each cell payload to form a cell. Similarly, received cells are reassembled into the respective receive signals. The headers of the cells are generated in the access multiplex to provide a virtual channel indication and/or a virtual path indication. The header indicates the path which is being followed to pass the cells to a central office 22. The central office 22 may modify the header again in the cells to identify the path through which the cells are subsequently being transferred. The cells may then be transferred either to a television access 24 or to a telephone access 26 at receiving stations generally indicated at 28 in FIG. 1.

Figure 2:
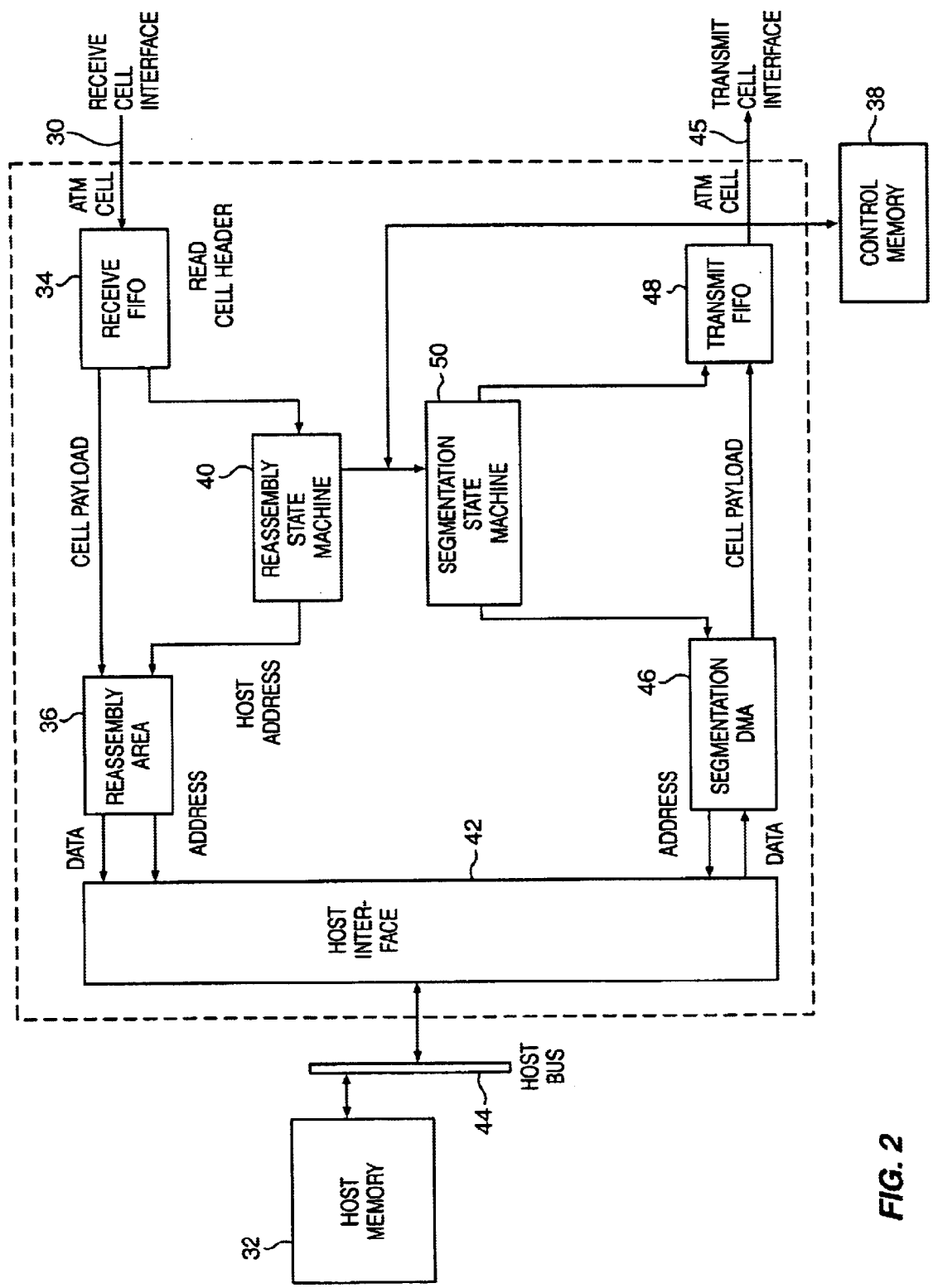
FIG. 2 is a schematic block diagram on a simplified basis of a system included in the system shown in FIG. 1 for transferring cell payloads between a cell interface and a host memory while processing the headers of the cells to control changes in the paths of such transfer.

FIG. 2 illustrates one embodiment of a sub-system disclosed and claimed in U.S. Pat. No. 5,949,781. This sub-system is generally indicated at 29 and is enclosed within a box defined by broken lines for use with the access multiplex 20 shown in FIG. 1 for providing a controlled transfer of ATM cell payloads between a line 30 from a receive cell interface and a host memory 32. When the cells are transferred from the line 30, the cells pass through a receive FIFO 34. The FIFO 34 constitutes a first-in-first-out memory well known in the art to provide a time buffer. The payload in each cell then passes to a reassembly direct memory access (DMA) stage 36. The header in each cell passes to a reassembly state machine 40 for processing.

The header in each cell is introduced from the reassembly state machine 40 to a control memory 38 which processes the header to provide addresses that indicate where the cell payloads are to be stored in the host memory 32. The addresses are then applied through the reassembly state machine 40 to the reassembly direct memory access (DMA) stage 36 to direct the payload from the FIFO 34 through a host interface 42 to a host or system bus 44. The cells are then transferred in the host memory 32 to the addresses indicated by the control memory 38.

Cells may also be transferred to a transmit cell interface through a line 45 by the sub-system 29 shown in FIG. 2. The segmentation state machine 50 reads addresses from the control memory 38 that indicate where cell payloads are stored in the host memory 32. The addresses are then applied by the segmentation state machine 50 to the segmentation direct memory access (DMA) 46 to direct the cell payloads to the transmit FIFO 48. The transmit FIFO 48 may be constructed in a manner similar to the receive FIFO 34. The header is introduced by the control memory 38 to the segmentation state machine 50 for combination in the transmit FIFO 48 with the payload. The recombined cell then passes to the transmit cell interface line 45.

Figure 3:
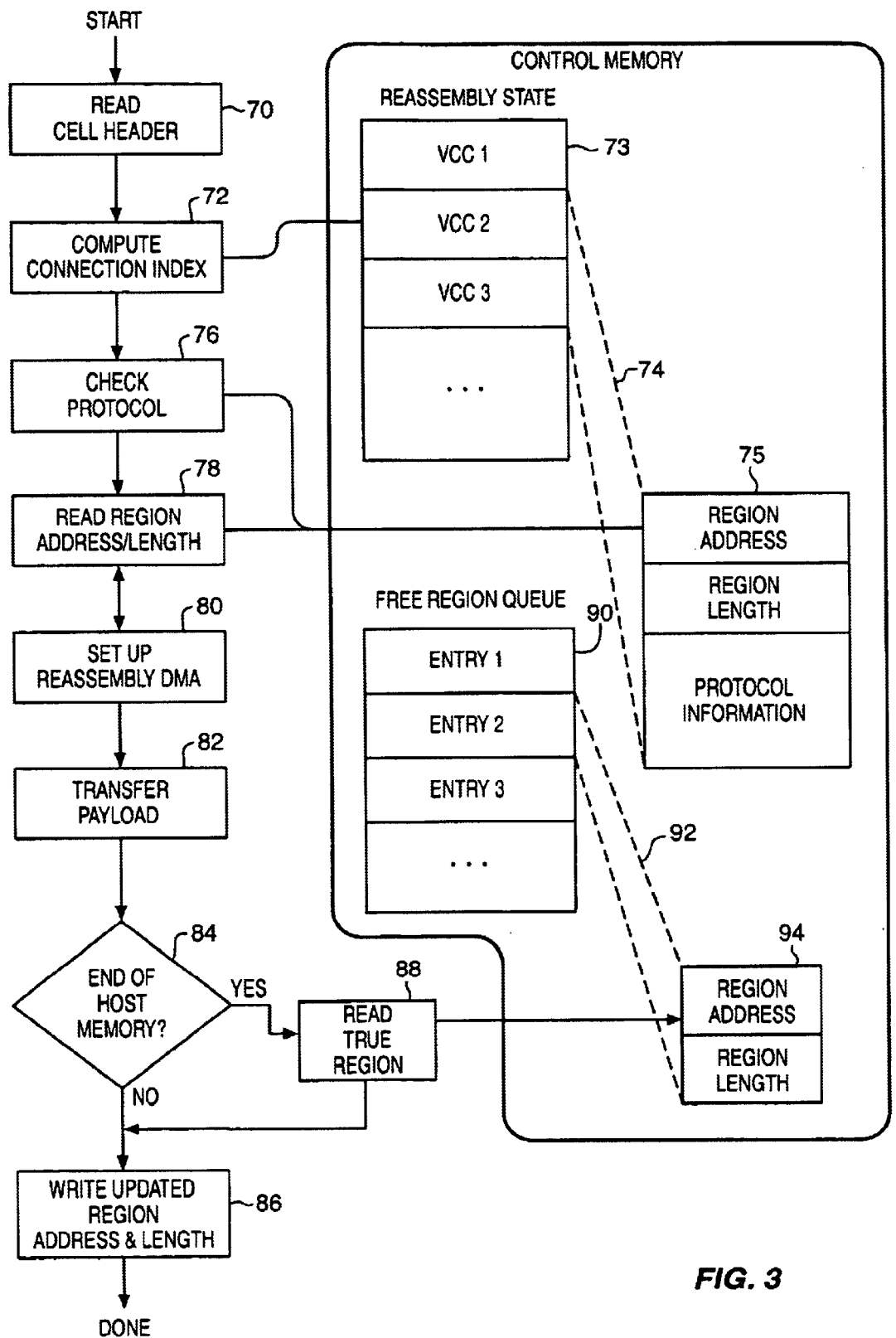
FIG. 3 is a schematic functional diagram showing, in additional detail in block form, the operation of the sub-system shown in FIG. 2 when the cell payloads are transferred from the receive cell interface to the host memory.

FIG. 3 shows a flow chart also shown in U.S. Pat. No. 5,949,781. This flow chart shows in additional detail the operation of the sub-system shown in FIG. 2 in separating the header and the payload in a cell, reassembling the cell payloads and recording the reassembled payloads in the host memory 32. In the flow chart shown in FIG. 3, the cell header is initially read as at 70. The header is used to compute a "connection index" (see block 72) to yield a memory address in a reassembly state. This is indicated as a table 73 designated as "Reassembly State" in the control memory 38. The table 73 contains a plurality of virtual channel connections which are respectively designated as "VCC 1" "VCC 2", "VCC 3", etc.

Each of the virtual channel connections 73 contains a table 75 which provides certain information including the address of a region of the host memory 38, the length of the region in the host memory and the protocol information for the virtual channel connection VCC. FIG. 3 schematically shows that the table containing the region address in the host memory 38, the length of the region address and the protocol information for the virtual channel connection VCC are being selected from the virtual channel connection designated as "VCC 2". This is indicated by broken lines at 74 and by the table 75 in FIG. 3. It will be appreciated that this is schematic and illustrative and that other VCC's may be selected.

The cell from the line 30 in FIG. 2 relating to the receive cell interface is then checked with the protocol information in the VCC 2 virtual channel connection in the table 75 in the control memory 38 as indicated at 76 in FIG. 3. If the check indicates that the protocol information in the header and the payload is correct, the region address in the host memory 32 and the length of such region are read from the VCC 2 block in the control memory 38 as indicated at 78 in FIG. 3. The region address in the host memory 32 is passed to the reassembly DMA 36 in FIG. 2 as indicated at 80. The reassembly DMA 36 is then activated to transfer the cell payload from the receive FIFO 34 in FIG. 2 to the host memory 32 as indicated at 82 in FIG. 3.

As the successive cell payloads for the VCC 2 table 73 are reassembled in the region, a check is made in each reassembly to determine if the end of the region in the VCC 2 channel connection has been reached. This is indicated at 84 in FIG. 3. If the answer is "No", the region address for successive cells is incremented for the successive payloads in the VCC 2 channel connection recorded in the host memory region and the region length is decremented by the same amount. A block 86 in FIG. 3 indicates this.

If the end of the region in the VCC 2 table in the control memory 38 has been reached, a "Yes" indication is provided from the block 84. This causes a block 88 to be activated in FIG. 3. This block is designated as "Read Free Region". The control memory 38 contains a Free Region Queue indicated at 90 in FIG. 3. When the block 88 is activated, it causes the next entry in the Free Region Queue 90 to be selected. For example, when entry 1 in the free region queue has been previously selected, entry 2 in the Free Region Queue 90 is now selected. This is indicated by broken lines 92 extending from the entry 2 in the Free Region Queue 90 to a table 94 in FIG. 3.

Entry 2 in the Free Region Queue contains a new address region in the host memory 38 and the length of such region. This information is transferred to the table 75 in place of the information previously recorded in the table. The blocks 78, 80, 82, 84, 86 and 88 are now operated as discussed above to transfer the payloads in the cells on the line 30 to the regions in the host memory 32. At the end of this region, entry 3 in the Free Region Queue may be selected to provide a new region address in the host memory 32 and the length of such region if the payload has not been completely recorded in the host memory 32. The steps described above are repeated in this manner until all of the payload has been recorded in the host memory 32.

Figure 4:
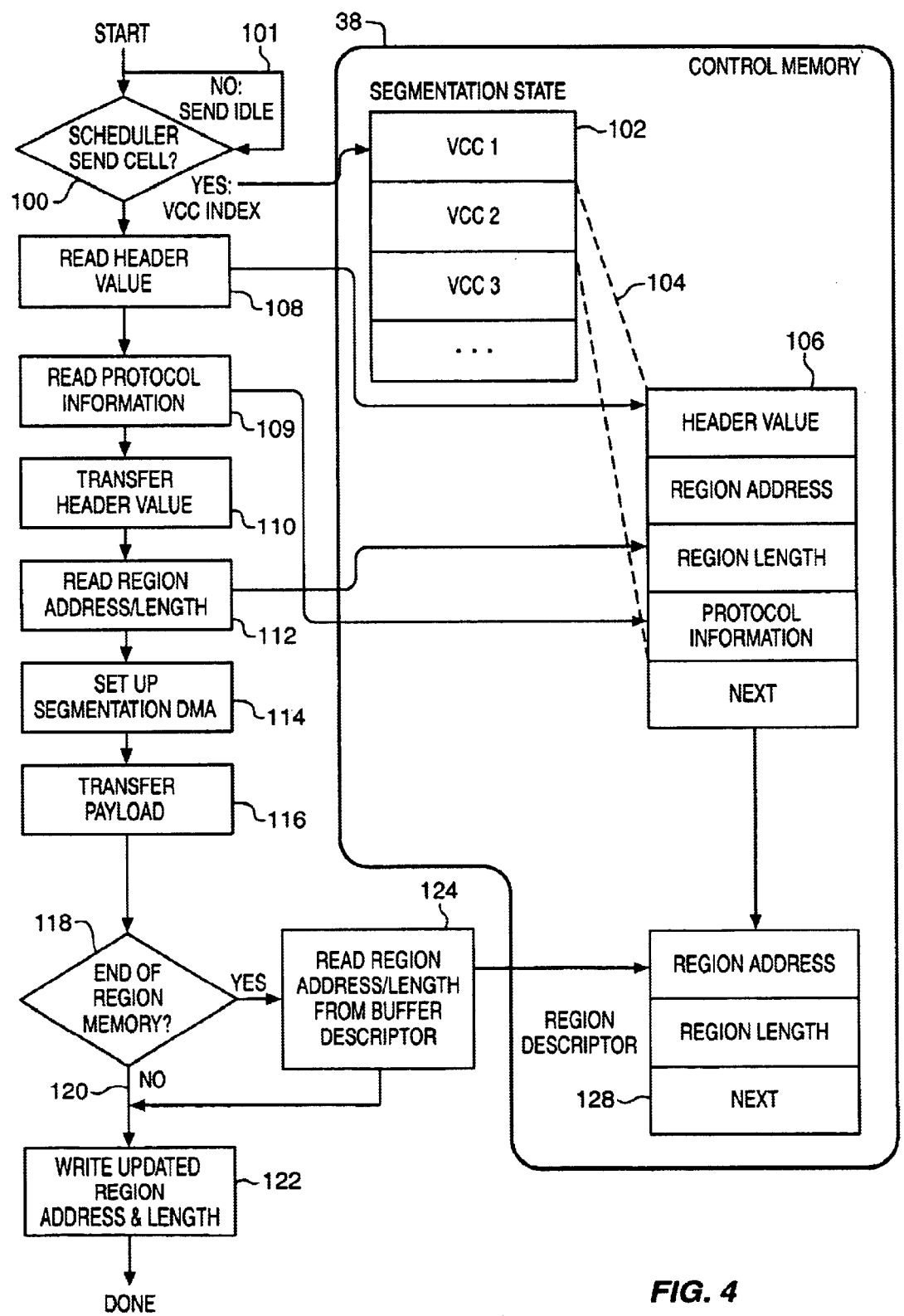
FIG. 4 is a schematic flow chart showing, in additional detail in block form, the operation of the sub-system shown in FIG. 2 when the cell payloads are transferred from the host memory to the transmit cell interface.

FIG. 4 shows a flow chart also shown in U.S. Pat. No. 5,949,781. FIG. 4 shows in additional detail the operation of the sub-system shown in FIG. 2 in transferring the cell payloads from the host memory 32, reading the header from the control memory 38 to indicate the ATM path, combining the header and the payload into a cell and transferring the cell to the line 45. In the flow chart shown in FIG. 4, a block 100 is provided to determine if a VCC cell has been scheduled for a particular time slot. If a cell has not been scheduled, an idle cell (i.e. no cell recorded in a time slot) is transferred to the line 45 in FIG. 2. This is indicated by a line 101 in FIG. 4.

If a cell has been scheduled for the particular time slot, the block 100 in FIG. 4 selects a virtual channel connection in a table 102 in the control memory 38. This table is designated as "Segmentation State" in FIG. 4. As shown in FIG. 4, the table 102 contains a plurality of virtual channel connections which are illustratively designated as "VCC 1", "VCC 2", "VCC 3", etc. The virtual channel connection VCC 2 is illustratively shown as being selected in the table 102. This is indicated by broken lines 104. It will be appreciated that any other block could have been chosen. The virtual channel connection VCC 2 illustratively includes a header value (to indicate the path of transfer of the cell), a region address, a region length, protocol information and the position of the next region description in the host memory. This is illustrated at 106 in FIG. 2.

The header value and the protocol information in the VCC 2 block are read from the control memory 38 as indicated at 108 and 109 respectively in FIG. 4. The header value is then transferred to the transmit FIFO 48 in FIG. 2 as indicated at 110 in FIG. 4 and the region address and length are read from the VCC 2 virtual channel connection as indicated at 112 in FIG. 4. The segmentation DMA 46 in FIG. 2 is then set up (see block 114 in FIG. 4) and the payload is transferred from the host memory region to the transmit FIFO 48 in FIG. 2 (see block 116 in FIG. 4). A check is made in each transfer of the payload of successive cell to determine if the region being transferred for the virtual channel connection 106 is at the end of its length. This is indicated at 118 in FIG. 4.

If the end of the host region in the VCC 2 virtual channel connection has not been reached as indicated at 120 in FIG. 4, the region address at 106 in the control memory is incremented to account for the successive payload transferred to the transmit FIFO 48 and the region length is decremented by the same amount (see block 122). This provides an updated record of the region address being processed in the virtual channel connection VCC 2 and an updated record of the remaining length of the region address to be processed in the virtual channel connection VCC 2.

When the end of the region address in the virtual channel connection VCC 2 has been reached, the address of the next region in the host memory 38 and the length of this region address are read as indicated at 124. This next region address is indicated as "Next" in the table 106 and is indicated in additional detail by a table 128 in FIG. 4 . The table 128 is designated as a "Region Descriptor" to conform to the designation in the block 124. The table 128 also contains a block designated as "Next". The table 128 is then transferred to the position of the table 106 to replace the information previously in the table 106. The address information transferred from the table 128 to the table 106 is then processed in the blocks 108, 109, 110, 112, 114, 116, 118, 120, 122 and 124 in the same manner as described above. Upon the completion of the processing of the region in the table 106, the "Next" block in the table 106 is processed to determine the subsequent host region address in the host memory 32 and the length of this region address.

Figure 5:
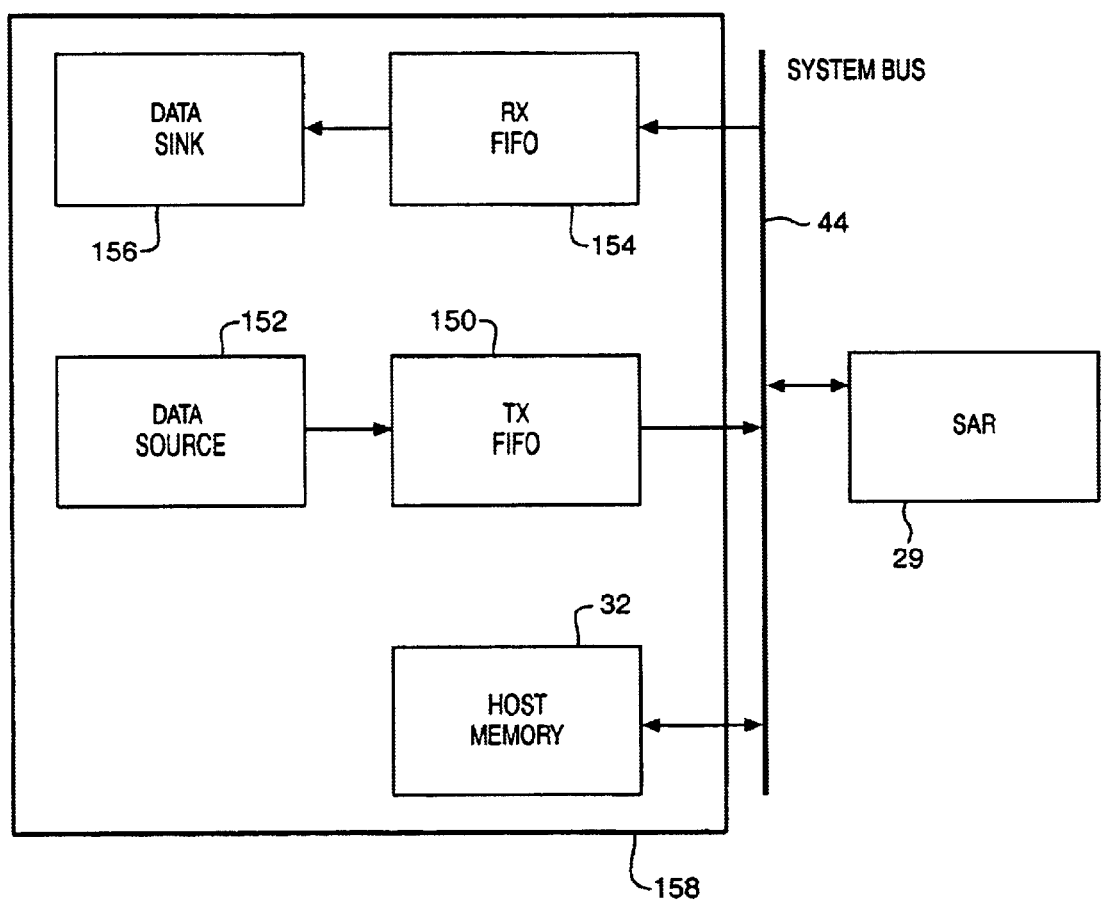
FIG. 5 is a schematic block diagram of a system for processing streaming data by using addresses in FIFO's, instead of a host memory buffer, to transmit and receive streaming data.

FIG. 5 is a simplified schematic block diagram of a system for transferring streaming data such as video or voice through a system bus (e.g. the host bus 44) to the segmentation and re-assembly sub-system 29 shown in FIG. 2 from a host transmit FIFO 150. The host transmit FIFO 150 receives the streaming data from a data source 152. FIG. 5 is also a simplified schematic block diagram of a system for transferring streaming data such as video or voice through the bus 44 from the segmentation and re-assembly sub-system 29 shown in FIG. 2 to a host receive FIFO 154. The host receive FIFO 154 then passes the received streaming data to a 8 data sink 156. The FIFO's 150 and 154, the data sink 156 and the data source 152 are shown as being included in a host 158 with the host memory 32 also shown in FIG. 2.

Figure 6:
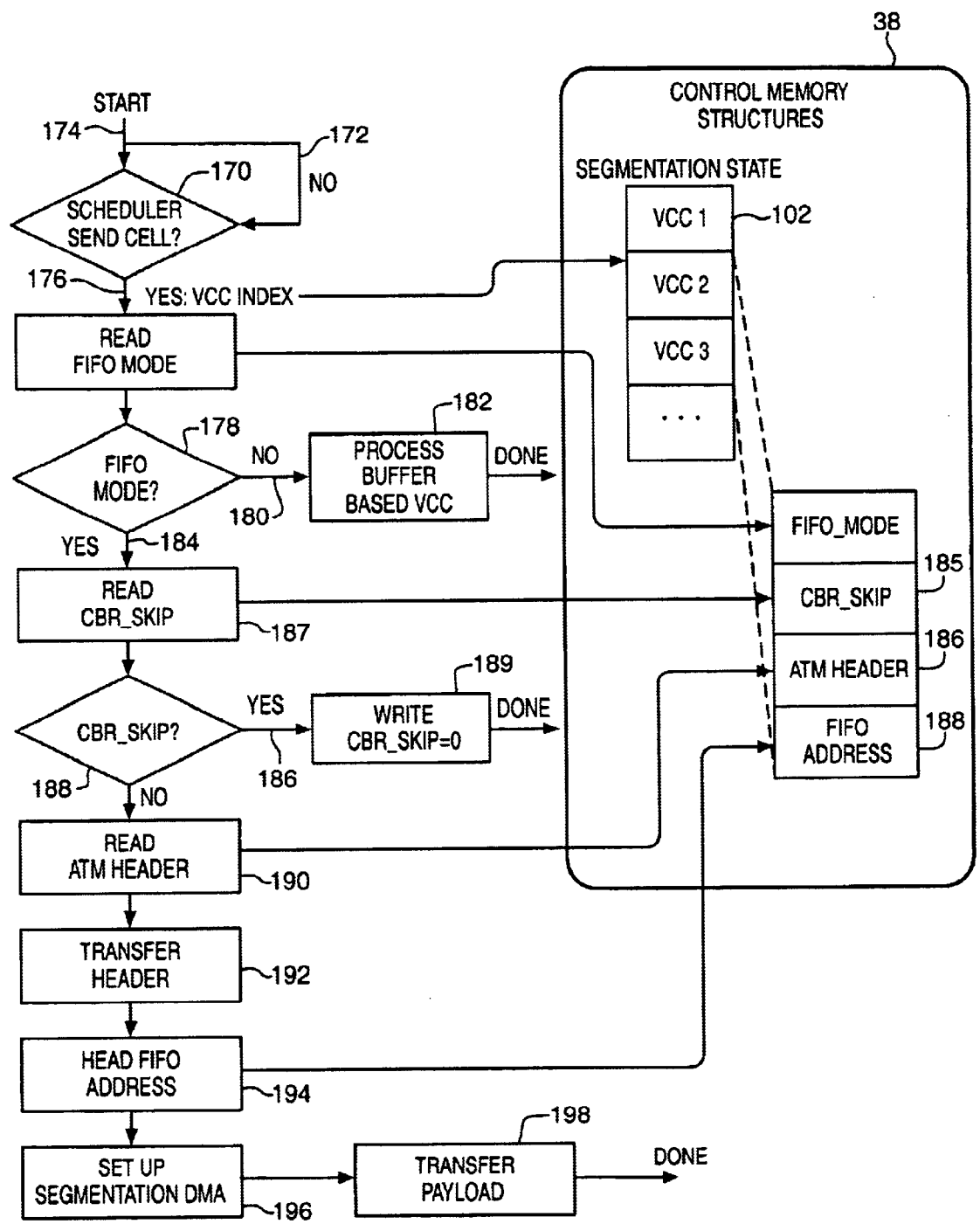
FIG. 6 is a schematic flow chart showing, in additional detail in block form, the successive steps for transmitting cell payloads of streaming data from a host transmit FIFO in a host.

FIG. 6 shows a flow chart for transmitting streaming data from the host transmit FIFO 150 to the segmentation and re-assembly sub-system 29 shown in FIG. 2. As shown in FIG. 6, a scheduler 170 determines if a cell should be transmitted from the host transmit FIFO 150 or host memory 32. If a cell has not been scheduled, the scheduler sends a signal on a line 172 to a start line 174 to provide another interrogation of the scheduler 170. If the scheduler has sent a cell, a signal is provided on a line 176. This causes a virtual channel connection (VCC) in the table 102 in the control memory 38 to be selected. This has been previously discussed in connection with FIG. 4.

A determination is then made as at 178 as to whether the packet data shown in FIG. 4 or the streaming data shown in FIG. 5 is being transferred from the host 158. If the system is not operating in the FIFO mode, a signal is produced as at 180. This causes packet data to be processed as discussed above in connection with FIG. 4. This is indicated at 182 in FIG. 6. This processing continues until a signal is produced on the line 182 to indicate that the processing of the packet data has been completed.

If an indication is provided as at 184 that the system is operating in the FIFO mode, the binary indication of a constant bit rate skip bit (CBR_SKIP) 185 is read from the control memory 38 as indicated at 187. If the binary indication of this bit is a "1", an indication is provided as at 186. Any transfer of streaming data is then skipped. At the same time, the binary indication of the CBR_SKIP bit is changed from a "1" to a "0" as indicated at 189. This provides for the subsequent transmission of the streaming data from the host transmit FIFO 150 in FIG. 5.

If the binary indication of the CBR SKIP bit is "0" as indicated at 188, the ATM header 189 is read from the control memory 38 as indicated at 190. This is the header that was previously provided as at 110 in FIG. 4. This header is transferred as at 192. The FIFO address 193 in the control memory 38 corresponding to the ATM header is then read from the control memory 38 as indicated at 194 in FIG. 6. This indicates where, in host memory space for the host transmit FIFO 150, the payload for the cell (identified by the ATM header read at 190) is located. The segmentation direct memory access (DMA) 46 in FIG. 2 is then set up as indicated at 196 in FIG. 6. The payload from the host transmit FIFO 150 is then transferred to the transmit FIFO 48 for combination with the cell header for such payload. This combination occurs in the transmit FIFO 48 in FIG. 2. As previously indicated, the cell header for such combination is obtained from the control memory 38 and is introduced from the control memory to the segmentation state machine 50 in FIG. 2.

The cell schedule in the segmentation and reassembly sub-system 29 in FIG. 2 is set to output the payload from cells from the FIFO 150 at a substantially constant rate. This rate is slightly higher than the fixed rate at which the payload from cells is transferred from the data source 152 into the host transmit FIFO 150. Because of this, the number of cell payloads in the host transmit FIFO 150 becomes progressively depleted. When the depletion reaches a particular value, the host transmit FIFO 150 provides an "almost empty" flag to indicate that there is only a minimal number of cell payloads remaining in the host transmit FIFO 150. For example, the "almost empty" flag may be provided when there is only one (1) cell payload remaining in the host transmit FIFO 150. Alternatively, the flag may be provided when there is only a small number (e.g. 5) cell payloads remaining in the FIFO 150.

When the flag is provided, the CBR_SKIP bit is set to "1". As previously indicated at 186 in FIG. 5, the transmission of cell payloads from the FIFO 150 is interrupted when the CBR_SKIP bit has a binary indication of "1". During this interruption, the data source 152 introduces cell payloads to the FIFO 150 to at least partially fill the FIFO. The CBR_SKIP bit is then set to a binary "0" by the segmentation and re-assembly sub-system 29 in FIG. 2 to obtain a continuation of the transfer of the cell payloads from the FIFO 150 to the segmentation direct memory access (DMA) stage 46 in FIG. 2.

Figure 7:
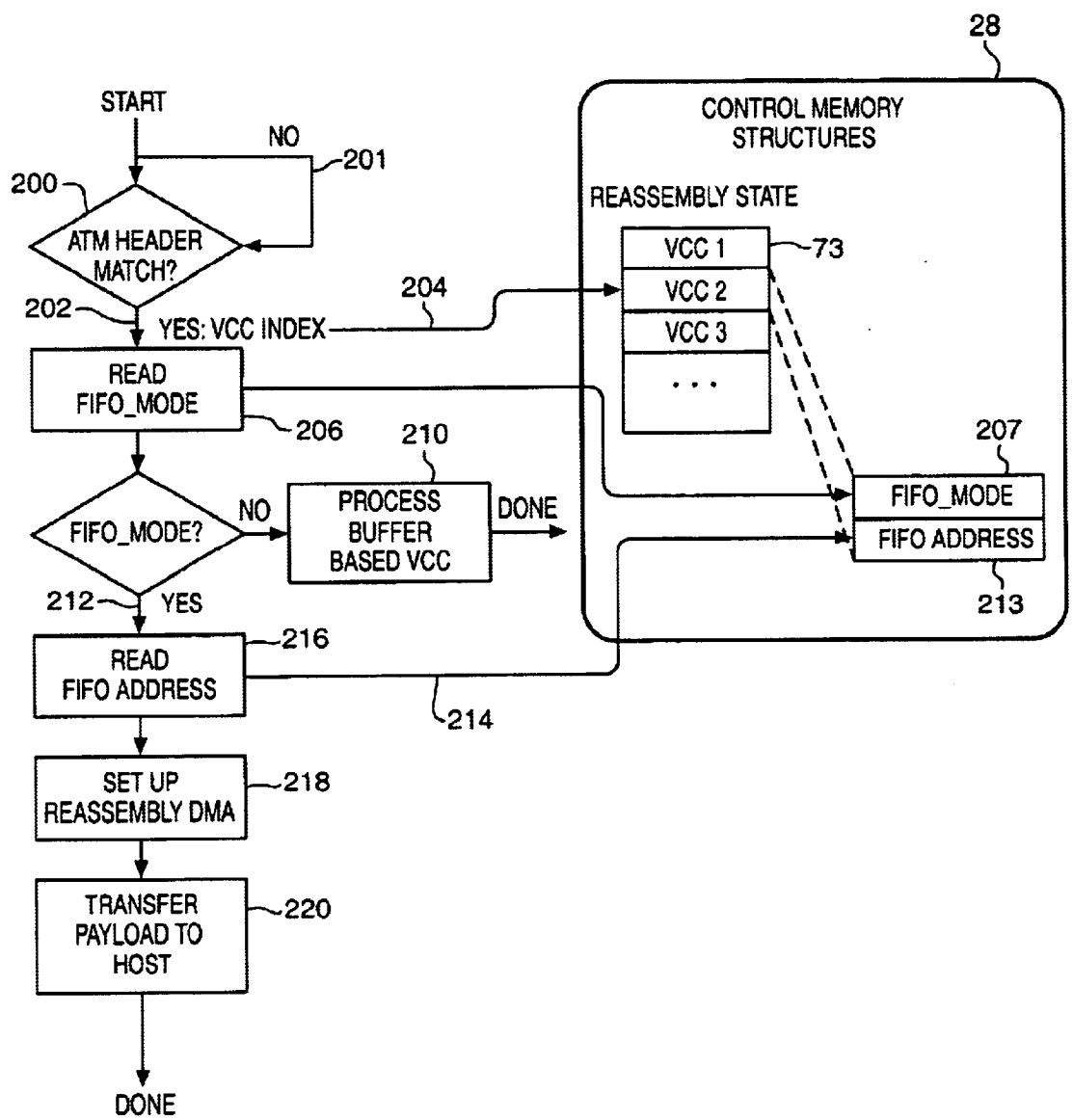
FIG. 7 is a schematic flow chart showing, in additional detail in block form, the successive steps of receiving cell payloads of streaming data at a host receive FIFO in the host.

FIG. 7 shows a flow chart for transmitting payloads relating to streaming data to the host receive FIFO 154 in FIG. 5 from the segmentation and re-assembly (SAR) sub-system 29 in FIG. 2. As a first step, an interrogation is made to determine if there is an ATM header match. For example, this interrogation may be made to determine if the header for each cell from the receive cell interface 30 in FIG. 2 is in proper form. This is indicated at 200 in FIG. 7. If the answer is "no" as indicated at 201, the interrogation is made again. If the answer is "yes" as indicated at 202 in FIG. 7, one of the virtual channel connections (VCC) 73 (also shown in FIG. 3) in the control memory 38 is selected. This is indicated at 204 in FIG. 7.

As indicated at 206 in FIG. 7, a determination is then made of the FIFO mode 207 in the control memory 38 as to whether the cells relate to the FIFO mode. If the answer is "no" as indicated at 208, a virtual control connection (VCC) 73 in the control memory 38 relating to packet data is processed. This processing is indicated at 210 in FIG. 7. The processing is indicated in FIG. 3 and is discussed above in connection with the showing in FIG. 3. The processing provides for the transfer of cell payloads into the host memory 32 in FIG. 2. If a determination is made as indicated at 212 in FIG. 7 that the cells being transferred relate to the FIFO mode, the FIFO address 213 in the control memory 38 of the host receive FIFO 154 in the control memory 38 is read as indicated at 214 in FIG. 7. Such reading is indicated in the flow chart at 216 in FIG. 7.

The address of the host receive FIFO 154 is determined in the control memory 38 as discussed above in connection with FIGS. 2 and 3. The address of the host receive FIFO 154 is then introduced to the reassembly state machine 40 in FIG. 2 and is combined in the re-assembly DMA 36 with the cell payload from the receive FIFO 34. The numeral 218 in FIG. 7 indicates this combination. The cell payload is then transferred to the host receive FIFO 154 in accordance with the address in the reassembly direct memory access 36. This is indicated at 220 in FIG. 7. This transfer occurs through the system bus 44.

A transfer of cell payloads from the FIFO 150 or to the FIFO 154 may be interrupted as a result of activity on the system bus 44 with a higher priority than such FIFO transfers. When the transfer from the host transmit FIFO 150 or to the host receive FIFO 154 resumes, the address of the FIFO on the system bus 44 will be the original FIFO address plus the number of bytes transferred from the host transmit FIFO 150 or to the host receive FIFO 154 before the interruption. For this reason, the address decode for both the host transmit FIFO 150 and the host receive FIFO 154 should respond to a range of addresses including the original FIFO address plus forty eight (48). The numeral forty eight (48) represents the number of bytes in an ATM cell payload.

Both the host transmit FIFO 150 and the host receive FIFO 154 should insure that they maintain cell alignment. The host transmit FIFO 150 maintains cell alignment by transferring a cell payload only when there is at least one (1) complete cell (or any specified number of cells other than one (1)) at the start of a transfer from the address in the FIFO. The host receive FIFO 154 maintains cell alignment by storing a cell payload only when there is room in the FIFO to receive at least one (1) complete cell payload at the beginning of an address from the FIFO.

The system and method disclosed above have certain important advantages. They provide for the segmentation and re-assembly of both packet data and streaming data. In providing such segmentation and re-assembly, the system and method of this invention provide for the segmentation of the cell header from the cell payload and the processing of the cell in the control memory 38 to provide a correlation between the cell header and the address of the cell payload in the host. In the case of packet data, the cell payload is transferred to or from a region address in the host memory 32 in the host. In the case of streaming data, the cell payload is transferred to the host transmit FIFO 150 or from the host receive FIFO 154. By employing the host FIFO's 150 and 154 for the streaming data instead of the host memory 32, the operation of the host memory 32 is significantly simplified, and the size and cost of the host memory is considerably reduced, in comparison to the cost and complexity of adding the host FIFO's 150 and 154.

Although this invention has been disclosed and illustrated with reference to particular embodiments, the principles involved are susceptible for use in numerous other embodiments which will be apparent to persons of ordinary skill in the art. The invention is, therefore, to be limited only as indicated by the scope of the appended claims.

What is claimed is:

1. A system, operable with a streaming data device for transferring, in an asynchronous transfer mode (ATM), a cell which has a header and which has a payload comprising streaming data, the system comprising:
   a FIFO connected to the streaming data device and having a plurality of addresses for receiving, storing and transferring the payload,
   interface means,
   state machine means responsive to the cell for separating the payload in the cell and the header in the cell,
   a control memory means being responsive to the header, without the payload, for selecting a FIFO address based on the header and for providing for the transfer of the payload, without the header, between at least one of the addresses of the FIFO, identified by the FIFO address, and the interface means,
   payload transfer means for transferring the payload, without the header, between the at least one of the addresses of the FIFO identified by the FIFO address and the interface means,
   means for providing in the control memory means a state table entry comprising the header for the payload, the FIFO address and an indication that the payload comprises the streaming data,
   means for transferring the payload, without the header, to the FIFO through the interface at the FIFO address identified in the state table entry,
   means for providing in the state table entry an indication of whether the transfer of the payload, without the header, to the FIFO address is to be provided or skipped, and
   means for transferring or skipping the transfer of the payload, without the header, into the FIFO in accordance with the indication of whether the transfer of the payload is to be provided or skipped.

2. A method of operating a system having a streaming data source and for providing, in an asynchronous transfer mode (ATM), a cell which has a header and which has a payload comprising streaming data, a method comprising the steps of:
   providing interface means,
   providing a FIFO connected to the streaming data source and having a plurality of addresses for receiving and transferring the payload,
   separating the header and the payload in the cell,
   providing a control memory,
   modifying the header in the control memory in accordance with the direction of transfer of the payload between the interface means and the FIFO,
   transferring the payload, without the header, between the interface means and the FIFO in accordance with the modified header, and
   skipping the transfer of the payload, without the header, between the FIFO to the interface means when a particular number of cells remain in the FIFO, thereby giving the FIFO an opportunity during such skipping to become at least partially filled with additional payloads, without headers, transferred from the streaming data source.

3. A Segmentation And Re-Assembly (SAR) system for use with a system bus and host system, the host system comprising a host memory coupled to the system bus and a receive FIFO coupled to the system bus that is separate from the host memory, the SAR system comprising:
   a receive interface configured to receive a first cell having a header and a payload; and
   SAR circuitry configured to:
      determine whether the first cell comprises streaming data or non-streaming data,
      if the first cell comprises streaming data, the operate in FIFO mode to transfer the payload of the first cell to the receive FIFO, and
      if the first cell comprises non-streaming data, then transfer the payload of the first cell to the host memory.

4. The SAR system of claim 3 wherein the SAR circuitry is further configured to:
   transfer the payload of the first cell to an address of the receive FIFO that corresponds to the header of the first cell.

5. The SAR system of claim 4 wherein the SAR circuitry is further configured to:
   remember the address of the receive FIFO if the transfer of the payload of the first cell is interrupted on the system bus.

6. The SAR system of claim 3:
   wherein the host system further comprises a transmit FIFO coupled to the system bus that is separate from the host memory, wherein the SAR system further comprises a transmit interface, and wherein the SAR circuitry is further configured to:

schedule a transfer of a second cell having a header and a payload over the transmit interface, determine whether the second cell comprises streaming data or non-streaming data, if the second cell comprises streaming data, then operate in the FIFO mode to retrieve the payload of the second cell from the transmit FIFO, and if the second cell comprises non-streaming data, the retrieve the payload of the second cell from the host memory.

7. The SAR system of claim 6 wherein the SAR circuitry is further configured to:

determine the header for the second cell; and retrieve the payload of the second cell from an address in the transmit FIFO that corresponds to the header for the second cell.

8. The SAR system of claim 7 wherein the SAR circuitry is further configured to:

remember the address in the transmit FIFO if the retrieval of the payload of the second cell is interrupted.

9. The SAR system of claim 7 wherein the SAR circuitry is further configured to:

combine the header for the second cell and the payload of the second cell.

10. The SAR system of claim 6 wherein the SAR circuitry is further configured to:

interrupt the retrieval of the payload of the second cell from the transmit FIFO responsive to receiving an indication from the transmit FIFO.

11. The SAR system of claim 3 wherein the streaming data comprises video data.

12. The SAR system of claim 3 wherein the streaming data comprises audio data.

13. A method of operating a Segmentation And Re-Assembly (SAR) system for use with a system bus and a host system, wherein the host system comprises a host memory coupled to the system bus and a receive FIFO coupled to the system bus that is separate from the host memory, the method comprising:

receiving a first cell having a header and a payload, determining whether the first cell comprises streaming data or non-streaming data, if the first cell comprises streaming data, then operating in FIFO mode to transfer the payload of the first cell to the receive FIFO, and if the first cell comprises non-streaming data, then transferring the payload of the first cell to the host memory.

14. The method of claim 13 further comprising:

transferring the payload of the first cell to an address of the receive FIFO that corresponds to the header of the first cell.

15. The method of claim 14 further comprising:

remembering the address of the receive FIFO if the transfer of the payload of the first cell is interrupted on the system bus.

16. The method of claim 13 wherein the host system further comprises a transmit FIFO separate from the host memory and wherein the method further comprises:

scheduling a transfer of a second cell having a header and a payload, determining whether the second cell comprises streaming data or non-streaming data, if the second cell comprises streaming data, then operating in the FIFO mode to retrieve the payload of the second cell from the transmit FIFO, and if the second cell comprises non-streaming data, then retrieving the payload of the second cell from the host memory.

17. The method of claim 16 further comprising:

determining the header for the second cell; and retrieving the payload of the second cell from an address in the transmit FIFO that corresponds to the header of the second cell.

18. The method of claim 17 further comprising:

remembering the address in the transmit FIFO if the retrieval of the payload of the second cell is interrupted.

19. The method of claim 17 further comprising;

combining the header for the second cell and the payload of the second cell.

20. The method of claim 16 further comprising:

interrupting the retrieval of the payload of the second cell from the transmit FIFO responsive to receiving an indication from the transmit FIFO.

21. The method of claim 13 wherein the streaming data comprises video data.

22. The method of claim 13 wherein the streaming data comprises audio data.

* * * * *